United States Patent [19]

Yanabu et al.

[11] Patent Number: 4,570,042

[45] Date of Patent: Feb. 11, 1986

[54] GAS-INSULATED SWITCHING APPARATUS

[75] Inventors: Satoru Yanabu, Machida; Susumu Nishiwaki, Yokohama; Eiichi Haginomori, Tokyo, all of Japan

[73] Assignee: Tokyo Shibaura Denki Kabushiki Kaisha, Kawasaki, Japan

[21] Appl. No.: 590,352

[22] Filed: Mar. 16, 1984

[30] Foreign Application Priority Data

Mar. 17, 1983 [JP] Japan .................................. 58-43120

[51] Int. Cl.$^4$ ........................ H01H 33/42; H02B 1/04
[52] U.S. Cl. ............................ 200/148 R; 200/148 B; 361/333; 361/341
[58] Field of Search ...................... 200/148 B, 148 R; 361/333, 341, 376

[56] References Cited

U.S. PATENT DOCUMENTS

| | | | |
|---|---|---|---|
| 4,032,820 | 6/1977 | Oishi et al. | 361/341 |
| 4,291,363 | 9/1981 | Oishi | 361/333 |
| 4,403,125 | 9/1983 | Yamaoka et al. | 200/148 R |
| 4,484,047 | 11/1984 | Olsen et al. | 200/148 B |
| 4,493,008 | 1/1985 | Haginomori | 200/148 B |

FOREIGN PATENT DOCUMENTS 2494491  5/1982  France .

OTHER PUBLICATIONS

S. Narimatsu et al., "Interrupting Performance of Capacitive Current by Disconnecting Switch for Gas Insulated Switchgear", IEEE Power Appar. Syst., vol. PAS-100, No. 6, pp. 2726-2732, 1981.

S. Nishiwaki et al., "Ground Fault by Restriking Surge of SF$_6$ Gas-Insulated Disconnecting Switch and its Synthetic Tests", IEEE Power Appar. Syst., PAS-102, No. 1, pp. 219-227, 1983.

S. A. Boggs et al., "Disconnect Switch Induced Transients and Trapped Charge in Gas-Insulated Substation", IEEE Power Appar. Syst., vol. PAS-101, No. 10, pp. 3593-3602, 1982.

Primary Examiner—Robert S. Macon
Attorney, Agent, or Firm—Oblon, Fisher, Spivak, McClelland & Maier

[57] ABSTRACT

A gas-insulated switching apparatus comprises gas-insulated interrupters, gas-insulated buses and gas-insulated disconnecting switches, whereby the movable electrode side terminals of all the disconnecting switches accommodated in the apparatus are so arranged as to be connected to gas-insulated interrupters to be disconnected from a power source, i.e., to a load line side to be interrupted by the disconnectors.

4 Claims, 7 Drawing Figures

| CASE 1 THE VOLTAGES OF THE ELECTRODES IMMEDIATELY BEFORE A RESTRIKING | | CASE 2 THE VOLTAGES OF THE ELECTRODES IMMEDIATELY BEFORE A RESTRIKING | |
|---|---|---|---|
| FIXED ELECTRODE NEGATIVE | MOVABLE ELECTRODE POSITIVE | FIXED ELECTRODE POSITIVE | MOVABLE ELECTRODE NEGATIVE |
| THE POLARITY OF SURGE VOLTAGE : NEGATIVE | | THE POLARITY OF SURGE VOLTAGE : POSITIVE | |
| CASE 3 THE VOLTAGES OF THE ELECTRODES IMMEDIATELY BEFORE A RESTRIKING | | CASE 4 THE VOLTAGES OF THE ELECTRODES IMMEDIATELY BEFORE A RESTRIKING | |
| MOVABLE ELECTRODE NEGATIVE | FIXED ELECTRODE POSITIVE | MOVABLE ELECTRODE POSITIVE | FIXED ELECTRODE NEGATIVE |
| THE POLARITY OF SURGE VOLTAGE : NEGATIVE | | THE POLARITY OF SURGE VOLTAGE : POSITIVE | |

FIG.5.

GAS-INSULATED SWITCHING APPARATUS

BACKGROUND OF THE INVENTION

1. Field of the Invention

This invention relates to a gas-insulated switching apparatus having interrupters disconnecting switches, buses and the like, and provided with line portions incorporated within ground potential metallic containers in which insulating gas is sealed.

2. Description of the Prior Art

For the purpose of limiting the site area required for substations or switching stations and for ease of designing salt-resist structures for use in coastal districts, a large number of gas-insulated switching apparatus has hitherto been utilized, which incorporate a series of device components such as interrupters, disconnecting switches and buses within grounded metal containers filled with insulating gas such as sulfur hexafluoride ($SF_6$) gas.

Disconnecting switches used for such apparatus in substations are operated in order to disconnect in-house devices from power system, or to perform changeover of in-house circuits. Switching operations of the disconnecting switches are carried out during the period while the adjacent interrupters are opened. The disconnecting switches switch small charging currents on short-distance lines connected to the adjacent interrupters in a substation.

When a disconnecting switch interrupts a charging current, a large number of restrikings occur, and these restrikings can cause grounding flash-over the disconnecting switch, as explained in IEEE Transactions on Power Apparatus and Systems, Vol. PAS-101, No. 10, pp. 3593–3602 and Vol. PAS-100, No. 6, pp. 2726–2732.

Many disconnecting switches employed in a substation are all identical in ratings when they are applied into identical system voltages, however, only specific disconnecting switches cause grounding faults. Such specific disconnecting switches may not readily be distinguished from healthy disconnecting switches which do not cause grounding faults because no difference can be seen when they are compared with an individual withstanding voltage test procedure. Further, phenomena have been observed whereby only disconnecting switches which are installed at the specific portions in a gas-insulated switching apparatus tend to cause grounding flash-over. The causes for such phenomena have not been recognized despite various experiments and studies.

SUMMARY OF THE INVENTION

It is an object of this invention to provide a gas-insulated switching apparatus capable of preventing occurrence of grounding faults from the electrodes within disconnecting switches accommodated in the apparatus, which are caused by restriking surges that occur when the disconnecting switches switch charging currents.

Another object of this invention is to provide an economical gas-insulated switching apparatus capable of preventing the occurrence of grounding flash-over on the disconnecting switches, without changing the layout.

Another object of this invention is to provide a gas-insulated switching apparatus wherein the insulation withstand voltage against the grounding of disconnecting switches need not be made higher than that of gas-insulated lines.

Another object of this invention is to provide a gas-insulated switching apparatus capable of preventing the occurrence of grounding faults on disconnecting switches in all locations such as bank bays, feeder bays and bus coupler bays of the gas-insulated switching apparatus that constitutes a substation of a duplicated bus system.

Another object of this invention is to provide a gas-insulated switching apparatus for use in a section in the case of either single-bus, or duplicated-bus system, capable of preventing occurrence of grounding faults on disconnecting switches.

According to one embodiment of this invention, a gas-insulated switching apparatus has gas-insulated buses and a plurality of feeder bays and bank bays both connected to the gas-insulated buses. The feeder bays and bank bays have gas-insulated interrupters connected with or between gas-insulated disconnecting switches. Each of the gas-insulated disconnecting switches have a disconnecting unit incorporated within a ground potential metallic container in which insulating gas is sealed. The disconnecting unit includes a movable electrode side shield provided with a movable electrode and a fixed electrode side shield disposed opposite the movable side shield and provided with fixed electrodes. The movable electrode is arranged so as to contact the fixed side contacts when closing, and particularly, to be positioned within said movable side shield when opening. All of the gas-insulated disconnecting switches for the respective bays are arranged so as to connect terminals led out from the movable electrodes to the terminal of the gas-insulated interrupters to be disconnected from the power source, i.e., to load sides which are to be interrupted.

According to another feature of this invention, the gas-insulated switching apparatus has first and second gas-insulated buses which constitute duplicated buses, and feeder bays and bank bays which are both connected to gas-insulated buses as well as bus coupler bays connected between the first and secong gas-insulated buses. The feeder bays, bank bays and bus coupler bays having gas-insulated interrupters connected with or between gas-insulated disconnecting switches. The gas-insulated switching apparatus is characterized by the fact that the gas-insulated disconnecting unit is incorporated within a ground potential metallic container in which insulating gas is sealed. The disconnecting unit includes a movable side shield provided with a movable electrode and a fixed side shield disposed opposite to the movable side shield and provided with fixed side electrodes. The movable electrode being so arranged as to contact the fixed side electrodes when closing and particularly, to be positioned within the movable side shield when opening. All of the gas-insulated disconnecting switches of the respective bays are arranged so as to connect terminals led out from the movable electrodes to terminals of the gas-insulated interrupters to be disconnected from power source, i.e., to load line sides to be interrupted.

BRIEF DESCRIPTION OF THE DRAWINGS

FIG. 5 is a diagram to illustrate the content of Table I with the electrode structures;

DESCRIPTION OF THE PREFERRED EMBODIMENT

Prior to describing the present invention, the phenomena associated with the use of disconnecting switches to interrupt charging currents will be described.

These phenomena can be considered as follows, as explained in IEEE Transactions on Power Apparatus and Systems, Vol. PAS-102, No. 1, pp. 219-227.

Figure 1:
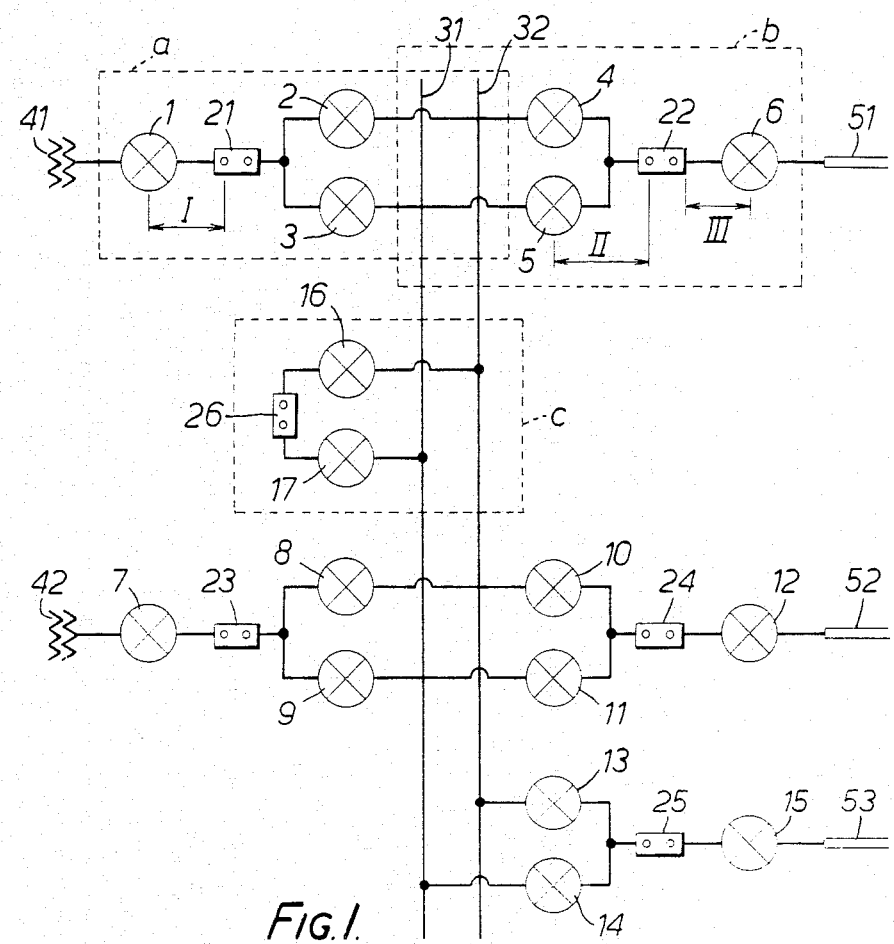
FIG. 1 is a skeleton diagram illustrating a structural example of a switching apparatus in a substation.

The SF$_6$ gas-insulated switching apparatus, as shown in FIG. 1, includes disconnecting switches, interrupters, and buses, respective charging portions of which, or partial portions thereof are incorporated within a ground potential metallic container in which SF$_6$ gas is sealed.

FIG. 1 shows an example of the structure for a gas-insulated switching apparatus in a substation. In FIG. 1, reference numerals 1-17 represent disconnecting switches, 21-26 interrupters, 31-32 buses, 41-42 transformers, and 51-53 transmission lines, respectively. The disconnecting switch 1 switches, for example, a short-distance line I connected to the interrupter 21 which has been opened, and the disconnecting switch 4 switches a line II when the switch 5 and the interrupter 22 has been opened, then the disconnecting switch 6 switches a short-distance line III connected to the interrupter 22. Here, a portion a encircled by the dotted line is usually called a bank bay, a portion b a feeder bay, and a portion c a bus coupler bay, respectively.

Figure 2:
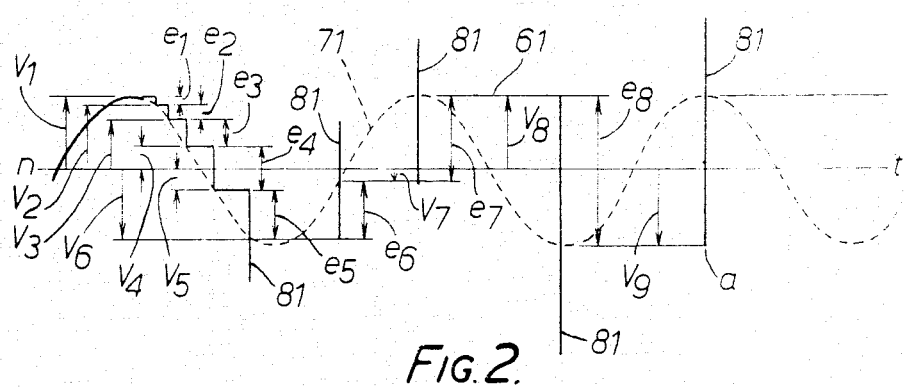
FIG. 2 is an explanative diagram to explain the occurrence of restriking surge voltages.

When the SF$_6$ gas-insulated disconnecting switch, accommodated in such apparatus in a substation, switches charging currents, a stepwise voltage waveform, with respect to the ground illustrated in FIG. 2 will be observed. In FIG. 2, reference numerals 61 and 71 represent respective voltages against the ground on the load side terminal and on the power source side terminal of the disconnecting switch, respectively. The waveform shown in FIG. 2 may be explained as follows: A small charging current is interrupted at the time after the electrode is opened, at which an instantaneous power source voltage $V_1$ that appeared upon interruption still remains on the load side line. Since power source voltage which is A.C. varies in magnitude and in polarity with respect to time, the difference between such residual voltage on the line and the power source voltage is applied across the electrodes of the disconnecting switch. At this instant, the disconnecting switching is still in the process of opening, and the insulation recovery across the electrodes is not yet sufficient, so that restriking occurs at the voltage $e_1$ across the electrodes. This causes flowing transient current to be attenuated, then interruption is immediately established, in turn, the residual voltage on the load side line remains as in such a magnitude as to coincide with a power source voltage $V_2$ at that instant. The power source voltage further varies, thus, a restriking occurs again at the voltage $e_2$ across the electrodes. Hereinafter, in the same fashion as above, restrikings repeatedly occur at the respective voltages $e_3, e_4, e_5, e_6, e_7, e_8, \ldots$ across the electrodes. The inter-electrode distance of the disconnecting switch increases gradually with respect to time, so that the magnitude relationship of such voltages across the electrodes shows in general as follows: $e_8 > e_7 > \ldots > e_2 > e_1$. When the insulation voltage across the electrodes e of the disconnecting switch recovers and reaches a magnitude twice or more than twice the crest value $V_1$ of the power source voltage ($e > 2V_1$), restriking no longer occurs and interruption is completed.

Upon respective occurrences of restrikings, surge voltages 81 occur as illustrated in FIG. 2. The transient oscillations of the surge voltages 81 have higher frequencies due to short-distance lines of the load side to be switched, and the frequencies reach as high as of several hundreds kHz up to several MHz. The surge voltages 81 occur such that the line voltages oscillate with the power source voltage as a center.

When the disconnecting switch interrupts a small charging current, a large number of restrikings occur, however, the residual voltages on the load side reach at maximum, that is, the crest value of the power source voltage. When consideration is given to the maximum restriking surge voltage, it is sufficient to discuss the case where a restriking occurs at the instant at which a power source side voltage reaches its crest value and also a load side voltage becomes a crest value of the power source voltage with the reversed polarity. In this case, the polarity of surge voltage coincides with the polarity of power source voltage.

Figure 3:
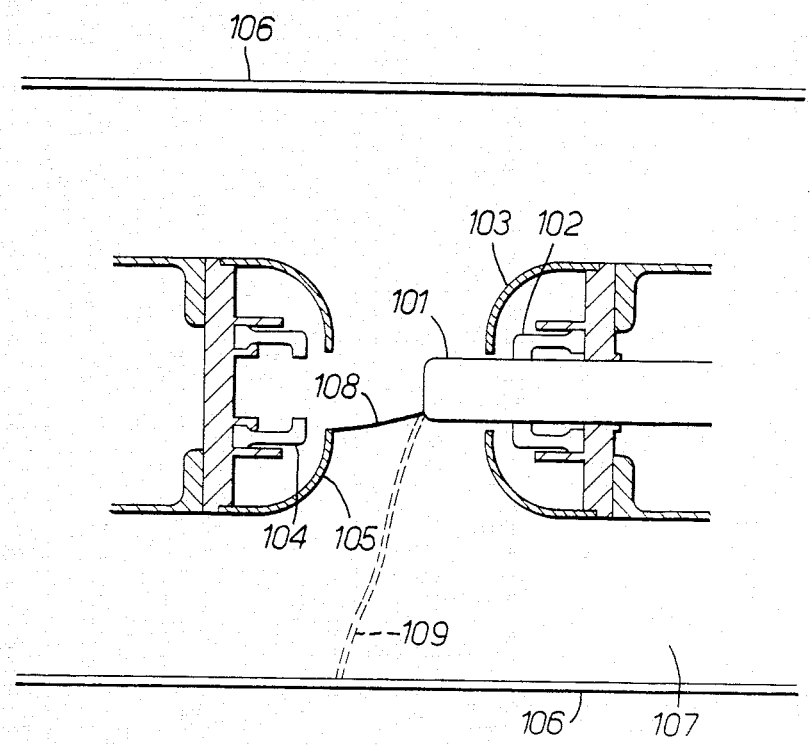
FIG. 3 is a schematic diagram illustrating restrikings occurring between electrodes of a SF$_6$ gas-insulated disconnecting switch.

FIG. 3 shows the inter-electrode of a SF$_6$ gas-insulated disconnecting switch and arc behavior upon occurrences of the restrikings described above. In FIG. 3, reference numeral 101 represents a movable electrode, 102 a contact on the movable side, and 103 a shield on the movable side, respectively. On the other hand, reference numeral 104 represents the electrode of the fixed side, 105 a shield on fixed side, 106 a ground potential metal container, 107 SF$_6$ (sulfur hexafluoride) gas, and 108, a restriking arc, respectively. The movable electrode 101, when in closed position, is in contact with the fixed side contact 104, however, when opening, it is driven to the right as shown, and eventually accommodated within the movable side shield 103. In the process of such driving of the movable electrode 101, the above-described restrikings occur a large number of times, and during this process the restriking arc 108 is formed.

It has been recognized that when the arc 108 is formed between the electrodes by restrikings and the surge voltages 81 shown in FIG. 2 occur between the movable electrode 101 and the ground potential metal container 106, the surge voltages 81 possibly cause grounding fault from the electrode 101. Here, reference numeral 109 represents such a grounding flash-over arc. It is also recognized that the magnitude of surge voltage sufficient to cause a grounding flash-over is considerably lower than the ground withstand voltage when the arc 108 in FIG. 3 does not appear, or than the ground withstand voltage with a wire conductor simulating the arc 108. Therefore, the grounding flash-over voltage cannot be determined only by the electrostatic field thereabout, and is largely dependent of occurrence of the arc 108.

On the other hand, in "withstand voltage" comparison tests, such a phenomenon is well-known that either when a rod-shaped electrode and a flat-plate-shaped electrode are oppositely arranged, or when a rod-shaped electrode has positive potential, namely when an electrode of the side to be a cause of inequality in electrostatic field has a positive potential, the withstand voltage becomes lower than when the rod-shaped electrode has a negative potential.

Thus, it is considered that the withstand voltage of the disconnecting switch in a gas-insulated switching apparatus can have a relationship when the the magnitude of the above-described surge voltage varies depending on the presence of restriking arcs. This result significantly affects the grounding flash-over voltage, and also the phenomenon in the withstand voltage comparison test. Thus, the structure of a $SF_6$ gas-insulated switching apparatus is such that the movable electrode side terminals of the entire disconnecting switches utilized in the $SF_6$ gas-insulated substation structured as shown in FIG. 1 are all connected to the respective load sides.

Figure 4:
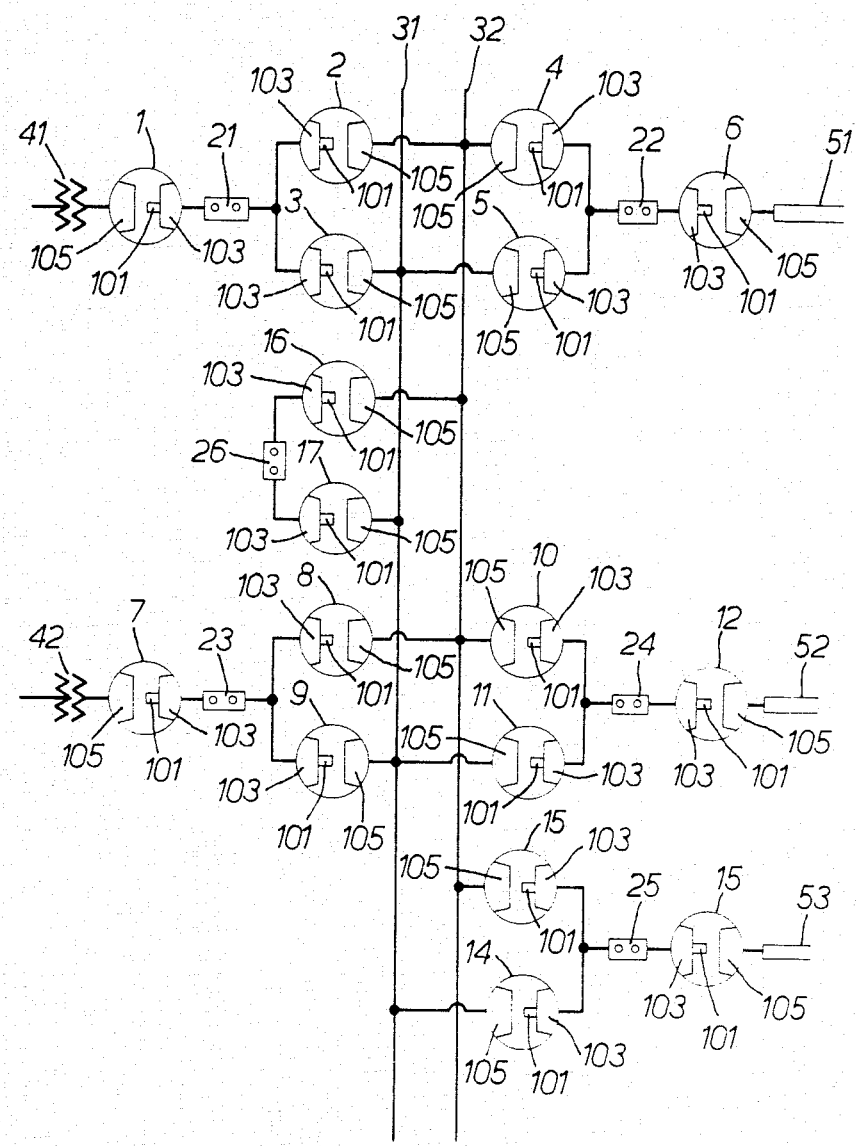
FIG. 4 is a schematic illustration to explain an embodiment of a gas-insulated switching apparatus according to the present invention.

FIG. 4 shows one embodiment of a gas-insulated switching apparatus structured taking the aforementioned into consideration so as to constitute a gas-insulated substation according to the present invention. FIG. 4 is a revised illustration of the disconnecting switches based on the skeleton diagram of FIG. 1 in order for that the arrangement of both movable and fixed contacts to be better appreciated. In FIG. 4, reference numerals 1-17 represent $SF_6$ gas-insulated disconnecting switches, 21-26 $SF_6$ gas-insulated interrupters, 31-32 $SF_6$ gas-insulated buses, and 41-42 transformers, respectively. Reference numerals 101, 103 and 105 respectively represent movable electrodes, movable side shields, and fixed side shields, all of which are of $SF_6$ gas-insulated disconnecting switches. The respective movable electrodes 101 and movable electrode terminals including the movable side shields 103 of the entire $SF_6$ gas-insulated disconnecting switches 1-17 are respectively connected to the corresponding load sides to be interrupted, i.e., to the $SF_6$ gas-insulated interrupters to be disconnected from the power source by means of the respective $SF_6$ gas-insulated disconnecting switches.

Now the load sides interruption will be explained. First, consider the disconnecting switch 1, when the disconnecting switch 1 is to be opened, prior to opening thereof, the interrupter 21 is opened. Thereafter, the disconnecting switch 1 will be opened. In an open circuit status, the movable electrode 101 of the disconnecting switch 1 is not energized because the interrupter 21 has been opened, while the fixed electrode of the disconnecting switch 1 is still energized because it has been connected to the transformer 41. In this specification, the sides which are not energized when disconnected by disconnecting switches are referred to as load sides.

On the other hand, when the disconnecting switches 2 and 3 are considered, prior to opening thereof the interruptor 21 is opened. Then the disconnecting switch 2 or 3 is opened, in this state, the fixed side electrode of the disconnecting switch 2 or 3 is still energized because it has been connected to the bus 32 or 31. Thus, in the disconnecting switches 2 and 3, the sides connected to the interrupter 21 will be the load sides. In the same manner as above, the load sides of the disconnecting switches 4-17 may be explained.

Next, in the above-described $SF_6$ gas-insulated switching apparatus, when the $SF_6$ gas-insulated disconnecting switch interrupts a charging current, as described above, a voltage remains on the load side. Should the restriking occur when the power source voltage is reverse in polarity to that of this residual voltage, then a greater surge voltage occurs. The polarity of the surge voltage, in this case, coincides with that of the power source voltage as shown in FIG. 2.

Table I represents four separate cases which can occur with a disconnecting switch. This table, in column 1, represents a relationship between the connection of the movable electrode terminal of the $SF_6$ gas-insulated disconnecting switch as to whether they are connected to the load side, i.e., the terminal of the $SF_6$ gas-insulated interruptor to be disconnected from the power source by the $SF_6$ gas-insulated disconnecting switch as shown in the cases 1 and 2, illustrated as A or whether the movable electrode terminals are connected to the power source side, i.e., the bus, as shown in cases 3 and 4 illustrated as B. The column 2 of the table designates, for each of the cases, the condition of the polarity of the residual voltage on the load side upon the occurrence of restriking whereas the columns 3 and 4 illustrate the resulting polarities of voltages either at the movable or fixed electrode immediately before restriking occurs. The column 5 illustrates the polarities of the surge voltage which is to occur due to the restriking.

| | 1<br>Connection of movable electrode terminal | 2<br>The polarity of the residual voltage on load side of the disconnecting switch | 3<br>The polarity of the voltage on the movable electrode immediately before a restriking | 4<br>The polarity of the voltage on the fixed electrode immediately before a restriking | 5<br>The polarity of surge voltage caused by the restriking |
|---|---|---|---|---|---|
| Case 1<br>A | The load side, i.e., the interrupter to be disconnected from the power source | Positive | Positive | Negative | Negative |
| Case 2<br>A | The load side, i.e., the interrupter to be disconnected from the power source | Negative | Negative | Positive | Positive |
| Case 3<br>B | The power source, i.e., the bus | Positive | Negative | Positive | Negative |
| Case 4<br>B | The power source, i.e., the bus | Negative | Positive | Negative | Positive |

FIG. 5 is an illustration of the electrode structure corresponding to the Table I.

In the four illustrated cases, the respective voltages to initiate a grounding flash-over differ significantly one from another even when the electrode structure and the distance to the inner wall of the container with the ground potential are identical. The fact that the lowest grounding flash-over appears in the case 4 has been confirmed by a large number of tests. This fact is considered to have a close relationship to a phenomenon whereby when the rod side of a rod-versus-flat plate electrode has a positive potential, that is, when the electrode side which becomes a cause of inequality in electrostatic field has a positive potential, the withstand voltage of the rod-versus-flat plate electrode becomes lower than that of when the potential is reversed.

The case 4 where the lowest ground short-circuit voltage appears in the structure of switching apparatus shown in FIG. 1 occurs only when the fixed electrodes of the disconnecting switches are connected to the load sides to be interrupted, that is, to the interrupter side to be disconnected from the power source. In the embodiment of the present invention shown in FIG. 4, all the movable electrodes of the $SF_6$ gas-insulated disconnecting switches are connected to the load side to be interrupted, that is, to the interrupter side to be disconnected from the power source, so that the above-described case 4, i.e., the condition in which the grounding flash-over voltage becomes lowest does not occur. Therefore, a substation which is less susceptible to grounding flash-over failures may be provided according to the present invention.

Figure 6:
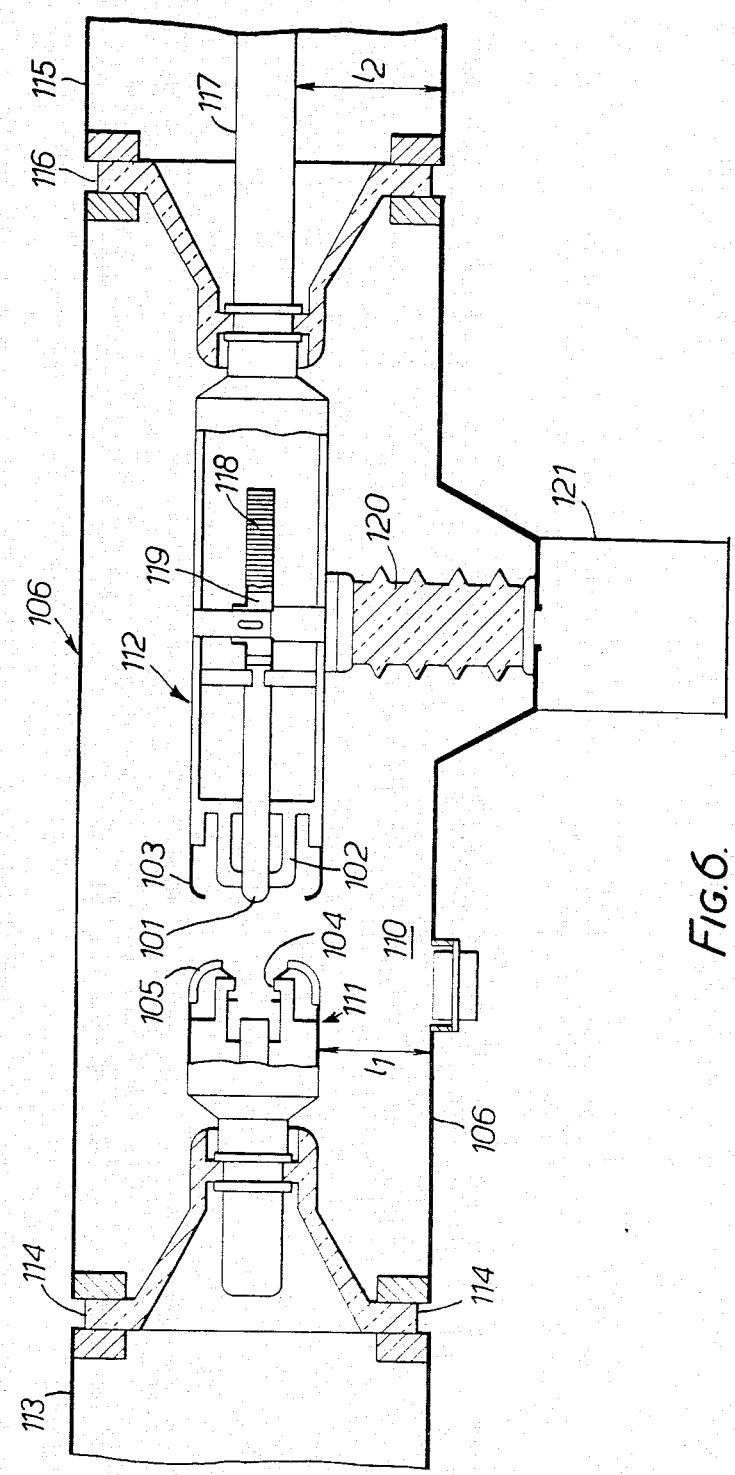
FIG. 6 is a cross-sectional view of an embodiment of a SF$_6$ gas-insulated disconnecting switch.
Figure 7:
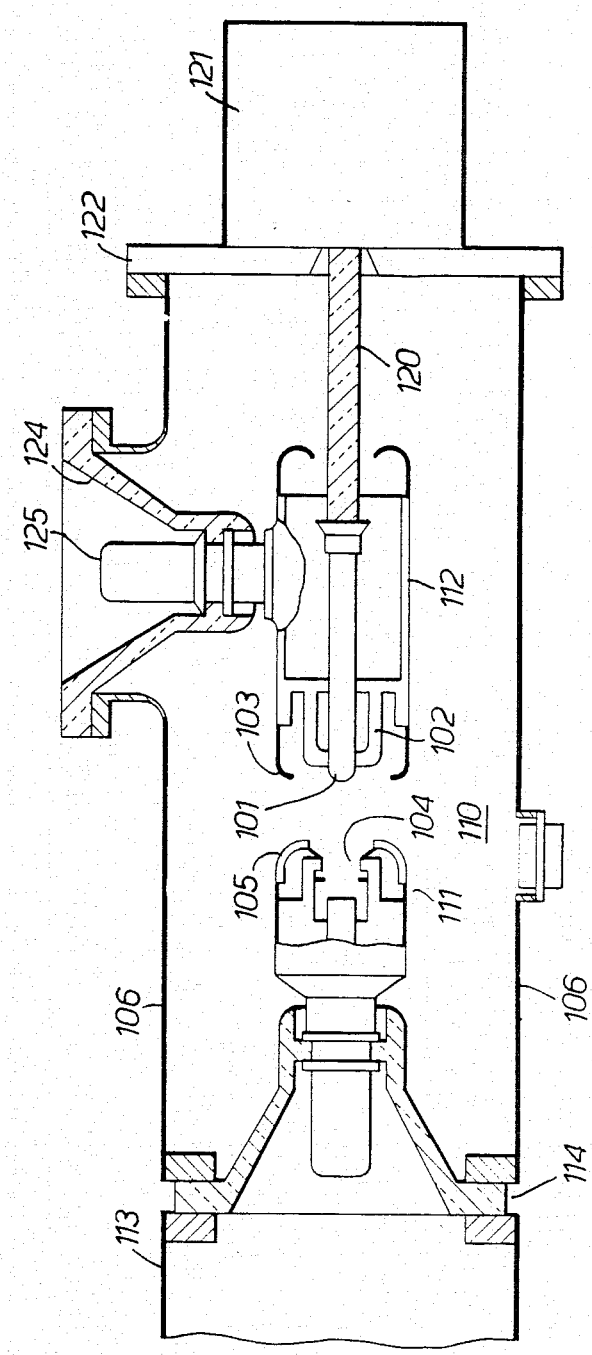
FIG. 7 is a cross-sectional view of another embodiment of a SF$_6$ gas disconnecting switch.

FIGS. 6 and 7 show structures of one embodiment of $SF_6$ gas-insulated disconnecting switches, respectively. The disconnecting switch shown in FIG. 6 has both fixed side and movable side terminals aligned in a straight line, while the disconnecting switch shown in FIG. 7 has the fixed side terminal arranged so as to intersect perpendicularly to the movable side terminal.

In FIGS. 6 and 7, a disconnecting unit 110 comprises a fixed side electrode 111 and a movable side electrode block 112. The fixed side electrode 111 is supported by an insulating spacer 114 sandwiched between metal containers 106 and 113. On the tip of the fixed side electrode 111 there are provided a plurality of fixed side contacts 104, and the tip is covered with an electrostatic field relaxation shield 105. The structure of the movable side electrode block 112 in FIG. 6 differs from that in FIG. 7, so that this will be first described. The movable side electrode block 112 in FIG. 6 is supported by an insulating spacer 116 sandwiched between metal containers 106 and 115, and connected through a terminal 117 to an interrupter or to a bus. On the tip of the movable side electrode block 112 there are provided a plurality of movable side contacts 102, and the tip is covered with an electrostatic field relaxation shield 103. A movable electrode 101 is attached so that it can shift right to left as shown in FIG. 6. Within the movable side electrode block there are provided a rack 118 and a pinion 119 that meshes with the rack 118. The pinion 119 is so arranged as to be rotated by an operating mechanism 121 through an operating rod 120.

Next, the structure of the movable side electrode 112 shown in FIG. 7 will be described. The movable side electrode block 112 is attached to a blank cover 122 through an insulating sleeve 123. On the tip of the movable side electrode block 112 there are provided a plurality of movable side contacts 102, and the tip is covered with an electrostatic field relaxation shield 103. The movable electrode 101 is attached so that it can shift right to left within the movable side electrode block 112 and the insulating sleeve 123 as shown in FIG. 7. The movable electrode 101 is coupled to be an operating mechanism 121 through an operating rod 120. The movable side electrode block 112 is electrically connected to a conductor 125 which is supported in insulation to a metal container 106 through an insulating spacer 124. The conductor 125 is led out in a direction perpendicular to the moving direction of the movable side electrode block 112. When the disconnecting switch shown in FIG. 7 is utilized for such a switching apparatus as shown in FIG. 1, the structure of the switching apparatus varies depending upon whether the movable side electrode terminals of the disconnecting switches are connected to the load line sides, that is, to the interrupter sides to be disconnected from the power source. By contrast, when the disconnecting switch shown in FIG. 6 is utilized in the switching apparatus shown in FIG. 1, such variations of the structure thereof may be avoided. Namely, in the switching apparatus shown in FIG. 1, it is more advantageous to utilize the disconnecting switch shown in FIG. 6 when all the movable side electrode terminals of the disconnecting switches are designed to be connected to the load sides, that is, to the interrupters to be disconnected from the power source.

In a $SF_6$ gas-insulated switching apparatus, gas-insulated lines which are designed to connect disconnecting switches and interrupters should withstand certain specified test voltage determined by the system voltage. On the other hand, an insulation against grounding of $SF_6$ gas-insulated disconnecting switches while opening or closing has hitherto been determined higher than the insulation against grounding of the gas-insulated lines because while restriking, as described above, there exists a phenomenon that the withstand voltage against the ground will be lowered. However, when the movable side electrode terminals of $SF_6$ gas-insulated disconnecting switch are respectively connected to the load sides to be interrupted, that is, to the terminal sides of the $SF_6$ gas-insulated interrupters to be disconnected from the power source, there exists almost no problem in such deterioration of insulation against grounding that has conventionally occurred upon restrikings. Therefore, it was confirmed that, by a large number of tests on charge currents of $SF_6$ gas-insulated disconnecting switches, the withstand voltage against grounding of $SF_6$ gas-insulated disconnecting switches while opening or closing need not be determined greater than the insulation withstand voltage against the ground of gas-insulated lines.

As a result, it was recognized that, as shown in the embodiment of FIG. 6, $l_1$, the shortest distance between the movable side electrode block 112 or the fixed side electrode 111 and the internal wall of the metal container 106 may be determined equal to or even smaller than $l_2$, the distance between the internal wall of the ground potential metal container 115 of the gas-insulated line and the conductor terminal 117 which is coaxial-shaped with respect to the internal wall of the container 115.

The aforementioned has been described as to the case where the respective gas-insulated disconnecting switches in the entire bays such as bank bays, feeder bays and bus coupler bays of the gas-insulated switching apparatus that constitutes a substation of duplicated-bus system are arranged such that the respective movable side terminals thereof are connected to the load sides.

However, the present invention is not limited to this structure. Namely, in the case of a substation of single-bus system, a gas-insulated switching apparatus that constitutes a bus coupler bay is not provided. Further, in the case of either single-bus, or duplicated-bus system, a gas-insulated switching apparatus for use in section is sometimes installed at the mid-portion of the bus. This section-use gas insulated switching apparatus comprises gas-insulated disconnecting switches connected respectively to both sides of the interrupter. In this case, the terminals of the disconnecting switches to be connected to the terminals of the interrupter shall be regarded as movable electrode sides of the disconnecting switches.

As described above, according to the present invention, there may be provided an economical gas-insulated switching apparatus in which the movable electrode side terminals of disconnecting switches are connected to the load sides, thereby causing the apparatus to be less susceptible to occurrence of grounding flash-over failure from the inter-electrode of the disconnecting switches caused by restrikings when the disconnecting switches are opened or closed, and also permitting the metal container diameter of the disconnecting switches to be reduced.

What is claimed as new and desired to be secured by Letters Patent of the United States is:

1. A gas-insulated switching apparatus comprising:
   a plurality of gas-insulated buses;
   a plurality of gas-insulated interrupters;
   a plurality of gas-insulated disconnecting switches; said interrupters and said disconnecting switches forming bank bays and feeder bays each of said bank and feeder bays being connected to said buses and wherein each of said gas-insulated disconnecting switches includes a disconnecting unit incorporated within a ground potential metallic container in which insulating gas is sealed, said disconnecting unit including;
   a movable side shield provided with a movable electrode; and
   a fixed side shield disposed oppositely to said movable side shield and provided with a fixed side electrode, said movable electrode having lead out terminals and being so arranged as to contact said fixed side electrode when closing, and particularly, to be positioned within said movable side shield when opening, all of said gas-insulated disconnecting switches for said respective bays being so arranged as to connect said lead out terminals from said movable electrodes to terminals of said gas-insulated interrupters which are to be disconnected from a power source whereby grounding faults between said electrodes and said metallic container are prevented.

2. A gas-insulated switching apparatus according to claim 1, wherein:
   said terminals led out of said movable electrodes and the electrode-constituting members of said fixed side electrode of said respective gas-insulated disconnecting switches are arranged in a single straight line.

3. A gas-insulated switching apparatus according to claim 1, wherein:
   the lines connected between the gas-insulated disconnecting switches and the gas-insulated interrupters are of gas-insulated lines constituted by conductors coaxially arranged within ground potential metallic containers in which insulating gas is sealed; and
   the distance between either the movable side shield or fixed side shield of the gas-insulated disconnecting switch and the internal wall of the ground potential metallic container thereof is equal to or shorter than the distance between the conductor of the gas-insulated line and the internal wall of the metallic container of the gas-insulated line.

4. A gas-insulated switching apparatus comprising:
   a first and a second gas-insulated bus which constitute duplicated buses,
   feeder bays and bank bays both connected to said gas-insulated buses; bus coupler bays connected between said first and second gas-insulated buses,
   said feeder bays, bank bays and bus coupler bay being comprised of gas-insulated interrupters connected between gas-insulated disconnecting switches, wherein said each of said gas-insulated disconnecting switches is incorporated within a ground potential metallic container in which insulating gas is sealed,
   each said disconnecting switch including;
   a movable side shield provided with a movable electrode;
   a fixed side shield disposed oppositely to said movable side shield and provided with a fixed side electrode,
   said movable electrode including lead out terminals and said movable electrode being so arranged as to contact said fixed side electrode when closing and when opening particularly, to be positioned within said movable side shield;
   said gas-insulated disconnecting switches being so arranged as to connect said lead out terminals of said movable electrodes to terminals of said gas-insulated interrupters which interrupters are to be disconnected from a power source whereby grounding faults between said electrodes and said metallic container are prevented.

* * * * *